Patented May 5, 1953

2,637,710

UNITED STATES PATENT OFFICE 2,637,710

ADHESIVE COMPRISING METHYL ISOPROPENYL KETONE-BUTADIENE COPOLYMER

George E. Hulse, Wilmington, Del., assignor to Hercules Powder Company, Wilmington, Del., a corporation of Delaware No Drawing. Application June 26, 1948,
Serial No. 35,531

9 Claims. (Cl. 260—27)

1

This invention relates to new adhesive compositions containing a copolymer of methyl isopropenyl ketone and butadiene as the adhesive material, which adhesive compositions are particularly suitable as pressure-sensitive adhesives.

Pressure-sensitive adhesives have been prepared in the past chiefly from natural rubber, the synthetic rubbers such as the copolymer of butadiene and styrene known as GR–S, and from neoprene. While adhesive compositions have been made from these polymers which serve in many applications, they lack the high degree of bond strength desired in many applications. In addition, they have the disadvantage of losing their adhesive properties on aging with the consequent separation of the laminated structure when used in lamination. Many attempts have been made to increase the bond strength and overcome the deterioration of the bond on aging by means of special tackifiers or other ingredients incorporated in the adhesive composition.

Now in accordance with this invention, it has been found that an emulsion copolymer of methyl isopropenyl ketone and butadiene in which the monomer ratio varies from 3:17 to about 9:11, respectively, and which copolymer is essentially completely soluble in organic solvents and has a viscosity as measured by the Mooney viscometer of at least 100, is a superior adhesive agent. Adhesive compositions containing the copolymer of the above monomer ratios and requisite physical properties have an unusual degree of adhesive strength, being superior to adhesive compositions made from either natural or synthetic rubber or from neoprene both as to initial bond strength and after aging for long periods of time.

The following examples will illustrate the preparation of the methyl isopropenyl ketone butadiene copolymer and its use in adhesive compositions in accordance with this invention. All parts and percentages are by weight unless otherwise indicated.

EXAMPLE 1

Methyl isopropenyl ketone and butadiene were

2 copolymerized in an emulsion by using the following polymerization formula:

| | Parts |
|---|---|
| Sodium lorol sulfate | 5.00 |
| Boric acid | 0.56 |
| Potassium persulfate | 0.30 |
| Aqueous sodium hydroxide, 0.525 N | 15.40 |
| Water, about | 150 |
| Methyl isopropenyl ketone | 30.0 |
| Butadiene | 70.0 |
| Mercaptan | 0.50 |

The pH of the aqueous phase in the above formulation was 10. The mercaptan used was the so-called primary mercaptan which is a mixture of approximately 5% of the $C_{10}$, 58% of the $C_{12}$ and 25% of the $C_{14}$ mercaptans with about 12% impurities. The polymerization was carried out at 40° C. for 7 hours after which 0.6 part of technical phenyl β-naphthylamine dispersed in a 2.8% solution of sodium lorol sulfate was added. The latex was then coagulated by adding about 400 parts of saturated salt solution and 800 parts of ethanol. The mixture was sparged with steam to remove any unreacted butadiene, washed by decantation and the rubber was then dried in a vacuum oven at 75°–80° C. An 85% conversion was obtained. The copolymer was completely soluble in benzene and had a Mooney viscosity of 117.

Equal parts of this copolymer and, as a resin tackifier, the pentaerythritol ester of polymerized rosin were dissolved in benzene to give a 14% solids solution. The solution was brushed onto samples of white duck fabric, after which the coated cloth was aged for 24 hours at 25° C. and 50% humidity. The coated fabric was pressed together at room temperature using 1780 p. s. i. pressure, in such a manner that the 2 ends of the tape were unbonded. These ends were then put in the jaws of a Scott DH–2 tensile strength machine and pulled. The tensile strength, in pounds per inch of tape, was recorded. The adhesive strength of this adhesive composition was 44 pounds per inch.

A benzene solution containing 16.5% solids and equal weights of the above copolymer and, as a resin tackifier, a maleic acid-modified pentaerythritol ester of rosin was prepared and brushed onto duck cloth tapes which were conditioned, pressed, and tested as described above. The adhesive strength was 29 pounds per inch. After aging for 15 weeks, another portion of the strip was tested and found to have increased in adhesive strength to 46 pounds per inch.

EXAMPLE 2

Methyl isopropenyl ketone and butadiene were copolymerized in emulsion, using the following polymerization formula:

|   | Parts |
|---|---|
| Sodium lorol sulfate | 5.00 |
| Potassium dihydrogen phosphate | 1.22 |
| Potassium persulate | 0.30 |
| Aqueous sodium hydroxide, 0.525 N | 10.36 |
| Water, about | 150 |
| Methyl isopropenyl ketone | 30.0 |
| Butadiene | 70.0 |
| Mercaptan (primary) | 0.24 |

The pH of the aqueous phase in the above polymerization formula was 7.0. The polymerization was carried out at 40° C. for 7 hours after which the polymer latex was worked up as described in Example 1. A conversion of 81% was obtained. The polymer was completely soluble in benzene and had a Mooney viscosity of 145.5

A solution cement containing this copolymer was prepared by dissolving equal weights of the copolymer and, as a tackifier, the glycerol ester of polymerized rosin to form a 16.5% solids solution. This composition had an adhesive strength of 37.5 pounds per inch when tested as described in Example 1.

EXAMPLE 3

A copolymer of methyl isopropenyl ketone and butadiene was prepared as described in Example 1 except that the latex with the dispersed antioxidant was distilled to remove any unreacted monomer. The latex was then used directly for the preparation of an adhesive composition without coagulating the rubber. To do so, the latex was mixed with an emulsion of the glycerol ester of polymerized rosin to give a 40% solids emulsion containing the resin tackifier and rubber in equal concentrations. This emulsion was applied to leather strips which were then conditioned for 24 hours at 25° C. and 50% humidity. The adhesive strength was determined on the tensile strength machine as described in Example 1 and found to be 25 pounds per inch.

EXAMPLE 4

Methyl isopropenyl ketone and butadiene were copolymerized in emulsion, using the following polymerization formula:

|   | Parts |
|---|---|
| Disproportionated rosin soap | 5.00 |
| Potassium persulfate | 0.30 |
| Aqueous sodium hydroxide, 0.525 N | 3.49 |
| Water, about | 150 |
| Methyl isopropenyl ketone | 30.0 |
| Butadiene | 70.0 |
| Mercaptan | 0.25 |

The aqueous phase had a pH of 10.1–10.3. The mercaptan used in this example was the so-called tertiary mercaptan which is a mixture of 60% of the $C_{12}$, 20% of the $C_{14}$ and 20% of the $C_{16}$ mercaptans. The polymerization was carried out at 40° C. for 7 hours. The latex was worked up and the rubber coagulated as described in Example 1. A conversion of 79% was obtained. The copolymer had a Mooney viscosity of 148.5 and was completely soluble in benzene.

A solvent cement containing 16.5% solids was prepared by dissolving the above copolymer and the pentaerythritol ester of polymerized rosin in a 1:1 ratio in benzene. The adhesive strength of this composition was determined as described in Example 1 and found to be 34 pounds per inch.

In accordance with this invention the copolymer of methyl isopropenyl ketone and butadiene may be used as the adhesive agent in pressure-sensitive adhesive compositions, provided that the copolymer is an emulsion copolymer in which the monomer ratio varies from about 3:17 to about 9:11 and that the copolymer is soluble in organic solvents and has a viscosity equivalent to a Mooney viscosity of at least 100.

It has been found that only the copolymer prepared by emulsion polymerization has the requisite adhesive strength for the adhesive compositions of this invention and that a methyl isopropenyl ketone-butadiene copolymer prepared by solution or bulk polymerization does not have the unusual degree of adhesive strength that is exhibited by the particular emulsion copolymers described herein. However, it has also been found that not all emulsion copolymers of methyl isopropenyl ketone and butadiene are suitable for use in adhesive compositions but that, as outlined above, the copolymer must contain a specific monomer ratio and must also have certain physical properties. The two physical properties of the methyl isopropenyl ketone-butadiene copolymers which have been found to affect the adhesive strength of compositions containing these copolymers as the adhesive agent are the viscosity and the solubility of the copolymer.

The copolymer which is used in the adhesive compositions of this invention may be prepared by any type of emulsion polymerization. That is, the standard emulsion polymerization formula may be used or the Redox-type systems may be used. The properties of the copolymer are influenced by many of the reaction conditions in the preparation of the copolymer as, for example, the emulsifier, amount of modifier, polymerization temperature, pH of the medium, etc. As more fully described below, any type of emulsifier may be used, modifier or other variations of the polymerization formula. Any of the usual polymerization catalysts may be used as, for example, potassium persulfate used in the above examples, organic peroxides, or any other free radical-producing compound.

The foregoing examples illustrate that the type of emulsifying agent used in the polymerization is not critical since copolymers having a viscosity within the desired range and having high adhesive strengths may be prepared using various types of emulsifying agents. Examples of emulsifying agents which may be used are the alkyl sulfates, alkyl amine salts, fatty acid soaps, disproportionated or dehydrogenated rosin soap, hydrogenated rosin soap, etc. Buffers may be used to aid in the control of the reaction and are sometimes desirable with certain emulsifying agents as in the case of the alkyl sulfates. Thus satisfactory copolymers may be prepared with any of the usual emulsifying agents, provided that proper adjustments are made in the polymerization formula as to pH, modifier addition, etc.

That neither the pH at which the polymerization is carried out nor the amount of modifier, e. g. mercaptan, which is added is a critical factor in the adhesive strength of the copolymer may be seen from the following series of experiments. In each of these examples, a mixture of methyl isopropenyl ketone and butadiene in the monomer ratio of 30:70 was polymerized under the same conditions except that the polymerizations were carried out at pH's of 7.0 and 10.0 with varying amounts of mercaptan. In each case the copolymer was completely soluble in benzene. The adhesive strengths of solution adhesives prepared from each of these copolymers using the same resin in each case; namely, the pentaerythritol ester of polymerized rosin, and a copolymer to resin ratio of 1:1, are compared in the following table:

*Table I*

| Example | pH of Preparation | Amt. Mercaptan Parts/100 of Monomers | Mooney Viscosity | Adhesive Strength, lbs./in. |
|---|---|---|---|---|
| 5 | 7 | 0.48 | 38.0 | 15.5 |
| 6 | 7 | 0.24 | 145.5 | 37.5 |
| 7 | 10 | 0.75 | 34.0 | 16.5 |
| 8 | 10 | 0.5 | 82.0 | 24.5 |
| 9 | 10 | 0.374 | 116.0 | 33.0 |
| 10 | 10 | 0.5 | 168.0 | 33.0 |

These examples illustrate that it is the viscosity of the copolymer which is formed rather than the pH or the modifier which is added. A polymer of excellent adhesive strength could be formed at a pH of 7 to 10, providing that adjustments were made in the polymerization formula as, for example, in the amount of modifier added, so that the polymer would have the requisite viscosity. In the same way, with a constant amount of modifier but widely different viscosity, due to a change in pH or other polymerization factors, entirely different adhesive strengths were obtained. In general a pH of from about 4 to about 11 is operable for the formation of a suitable copolymer, but usually a pH of about 7 to 10 is used. The amount and type of mercaptan or other modifier added will depend upon the other polymerization conditions. Typical of the alkyl mercaptans which may be used as modifiers are the commercial mixtures of mercaptans known as primary and tertiary mercaptans. These are mixtures of alkyl mercaptans containing 10, 12 and 14 carbon atoms and 12, 14 and 16 carbon atoms, respectively.

In accordance with this invention, it has been found that methyl isopropenyl ketone-butadiene emulsion copolymers, regardless of the specific polymerization formula used in preparing them, should have a Mooney viscosity of at least 100, preferably from about 100 to about 180 and more preferably from about 115 to about 150. Table II illustrates the effect of the viscosity of the copolymer on the adhesive strength of compositions containing these copolymers. For these experiments, copolymers of methyl isopropenyl ketone and butadiene in a monomer ratio of 30:70 were prepared as described in the foregoing examples, the viscosity being varied by the polymerization conditions. Emulsion adhesives were then prepared and evaluated as described in Example 3 with the following results. Emulsion adhesives are used to illustrate the effect of viscosity on the adhesive strength since any gel would interfere with the application of solvent cements.

*Table II*

| Example | Mooney Viscosity Polymer | Solubility in Benzene | Adhesive Strength, lbs./in. | |
|---|---|---|---|---|
| | | | 1 Coat Emulsion | 2 Coats Emulsions |
| 11 | 38.5 | complete | 4.9 | 6.3 |
| 12 | 73 | do | 9.4 | 9.1 |
| 13 | 114.5 | do | 13.0 | 18.2 |
| 14 | 166 | do | 10.0 | 21.6 |
| 15 | 188 | moderate amt. of gel. | 5.1 | 1.8 |

Thus, at low copolymer viscosities, the adhesive strength is low, the adhesive strength increasing with increasing viscosity up to a viscosity equivalent to about 100 Mooney viscosity, whereas in the high viscosity range, of about 100 to about 180 as measured by a Mooney viscometer, the adhesive strength does not change appreciably. However, when the viscosity goes beyond the point where gel appears, the adhesive strength again drops off sharply. On the other hand, if the viscosity is above 180 and there is no gel, the polymer still being completely soluble in benzene, the adhesive strength will be high.

Throughout the examples of this specification, the viscosity has been expressed in units as measured on a Mooney viscometer. This is a standard method in the rubber art of measuring the viscosity of polymers. The Mooney viscosity as referred to in this specification is expressed as Mooney ML; i. e., a 1.5 inch diameter rotor, and measured at a temperature of 212° F. In determining the viscosity, the sample is passed through a cool 6 x 12 inch roll mill 6 times to compact it. Then, after heating in the viscometer for 1 minute and running for 4 minutes, the reading is taken. Therefore, in specifying that the copolymers should have a Mooney viscosity of at least 100 and preferably about 100 to about 180 is meant that the copolymer should have a viscosity equivalent to at least 100 when measured on the Mooney viscometer. The upper limit of 180 in the preferable range is about the upper limit at which the Mooney viscosity can be measured. The viscosity may be higher than that which can be measured on the Mooney viscometer, provided that the polymer is still soluble.

Another requirement of the methyl isopropenyl ketone-butadiene copolymer for high adhesive strength is that it have specific solubility characteristics. The copolymer must be essentially completely soluble in organic solvents as, for example, hydrocarbon solvents such as benzene, toluene, xylene, etc., methyl ethyl ketone, ethyl acetate, carbon tetrachloride, etc. As may be seen from the above table, if the copolymer dissolves in benzene with the formation of any appreciable amount of gel, the adhesive strength drops off. One of the simplest measurements of solubility is the determination of the solubility in benzene. If the polymer dissolves in the benzene with essentially no visible evidence of gel particles, it may be considered as completely soluble.

That the adhesive strength does not depend upon the viscosity alone, but is also dependent on the ratio of methyl isopropenyl ketone to butadiene in the monomer mixture may be seen from the following series of experiments. In these examples, copolymers of methyl isopropenyl ketone and butadiene containing varying ratios of the monomers were prepared under conditions to yield polymers having Mooney viscosities within the range from which maximum adhesive strength is obtained. All of the copolymers were completely soluble in benzene. Solvent cements were then prepared from each, which cements had a solids content of 16.7% and a 1:1 ratio of the copolymer to the glycerol ester of polymerized rosin as a tackifier. The results of testing these cements for their adhesive strength by the method described in Example 1 are given in the following table.

Table III

| Example | Parts Methyl Isopropenyl Ketone to Butadiene | Mooney Viscosity | Adhesive Strength, lbs./in. |
|---|---|---|---|
| 16 | 10:90 | 128 | 9.3 |
| 17 | 20:80 | 128.5 | 31.7 |
| 18 | 30:70 | 141 | 28 |
| 19 | 40:60 | 140 | 22.5 |
| 20 | 50:50 | 151 | 16.1 |

At a given viscosity, even within the prescribed range, the adhesive strength may be seen to vary with the ratio of methyl isopropenyl ketone to butadiene in the monomer mixture. For a high adhesive strength, therefore, the methyl isopropenyl ketone-butadiene copolymer must not only have a Mooney viscosity within the range of about 100 to about 180, but must also have a monomer ratio within certain limits. It has been found that for maximum adhesive strength the monomer mixture from which the copolymer is prepared should contain from about 15 to about 45 parts of methyl isopropenyl ketone and from about 85 to about 55 parts of butadiene and preferably should contain from about 20 to about 35 parts of methyl isopropenyl ketone and about 80 to 65 parts of butadiene. This may be conveniently expressed as the ratio of methyl isopropenyl ketone to butadiene, in which case the limits would be a ratio of methyl isopropenyl ketone to butadiene of from about 3:17 to about 9:11 or preferably from about 1:4 to about 7:13.

The adhesive compositions, in accordance with this invention, are prepared by admixing the methyl isopropenyl ketone-butadiene copolymer, having the above specified properties, with a tackifier. The adhesive composition may be in the form of either a solution or so-called solvent cement or it may be in the form of an emulsion adhesive. As a rule, higher adhesive strengths are obtained when the copolymer and tackifier are used in solution rather than in emulsion. In the preparation of solvent cements, the copolymer and a resin tackifier may be dissolved in any suitable organic solvent as, for example, hydrocarbon solvents such as benzene, toluene, xylene, etc., or carbon tetrachloride. Methyl ethyl ketone, etc. The solution may contain any desired percentage of solids, which percentage will usually depend upon its ultimate use. For the preparation of emulsion adhesives the polymer will not be isolated from its latex but the latex will be admixed directly with an emulsion of the resin tackifier. As in the case of the solvent cements, the amount of solids in the emulsion will depend upon the use of the emulsion.

Any of the commonly used tackifiers may be admixed with the methyl isopropenyl ketone-butadiene copolymer to form the adhesive compositions of this invention. Particularly effective are resin tackifiers as, for example, the polyhydric alcohol esters of resin acids such as ester gum, the glycerol ester of hydrogenated rosin, the glycerol ester of polymerized rosin, the pentaerythritol ester of rosin, the ethylene glycol ester of rosin, the pentaerythritol ester of polymerized rosin, maleic-acid modified ester gums, the maleic acid-modified pentaerythritol esters of gum or wood rosins which may also be further modified, etc. Other resin tackifiers which may be used are rosin, hydrogenated rosin, polymerized rosin, the coumarone-indene resins, polymerized pinene, the resinous copolymer of hydroabietyl fumarate and styrene, etc. Some resins have been shown to contribute particularly to the age resistance of the adhesive and, in some cases, the strength of the adhesive bond has actually increased on aging as illustrated in Example 1 in which a maleic acid-modified pentaerythritol ester of rosin was admixed with the methyl isopropenyl ketone-butadiene copolymer.

The amount of tackifier to be admixed with the copolymer in forming the adhesive compositions will depend upon the permanency desired in the adhesive bond. In general, high strength adhesive compositions are obtained at a resin to copolymer ratio of 1.5:1, particularly high strength adhesives being obtained with a resin to copolymer ratio of 1:1.

The adhesive compositions of this invention are effective on paper, glass, cellophane, rubber, metal, cloth, leather, wood, etc. These adhesive compositions are particularly useful as pressure-sensitive adhesives and as such are useful in the preparation of surgical tapes, cloth bonding in upholstery and luggage, in leather bonding such as in footwear and luggage, in wood bonding as, for example, in the manufacture of plywood and furniture, and in the preparation of high grade pressure-sensitive tapes such as cellophane tapes and masking tapes.

In any of the above applications of these adhesive compositions the strength of the bond will depend upon the type and number of coats applied to the material to be bonded and upon the pressure used in the bonding, the strength of the bond increasing with an increasing laminating pressure.

What I claim and desire to protect by Letters Patent is:

1. An adhesive composition comprising the copolymer obtained by the emulsion polymerization of a mixture of methyl isopropenyl ketone and butadiene in the ratio of from about 3:17 to about 9:11, and a resin tackifier, said copolymer being essentially completely soluble in benzene and having a Mooney viscosity of at least 100.

2. A pressure-sensitive adhesive composition comprising the copolymer obtained by the emulsion polymerization of a mixture of methyl isopropenyl ketone and butadiene in the ratio of from about 3:17 to about 9:11, and a resin tackifier, said copolymer being essentially completely soluble in benzene and having a Mooney viscosity of about 100 to about 180.

3. A pressure-sensitive adhesive composition comprising the copolymer obtained by the emulsion polymerization of a mixture of methyl isopropenyl ketone and butadiene in the ratio of from about 3:17 to about 9:11, and a resin tackifier, said copolymer being essentially completely soluble in benzene and having a Mooney viscosity of about 115 to about 150.

4. A pressure-sensitive adhesive composition comprising the copolymer obtained by the emulsion polymerization of a mixture of methyl isopropenyl ketone and butadiene in the ratio of from about 1:4 to about 7:13, and a resin tackifier, said copolymer being essentially completely soluble in benzene and having a Mooney viscosity of about 115 to about 150.

5. A pressure-sensitive adhesive composition comprising the copolymer obtained by the emulsion polymerization of a mixture of methyl isopropenyl ketone and butadiene in the ratio of from about 3:17 to about 9:11, and a polyhydric alcohol ester of a rosin acid, said copolymer being essentially completely soluble in benzene and having a Mooney viscosity of about 100 to about 180.

6. A pressure-sensitive adhesive composition comprising the copolymer obtained by the emulsion polymerization of a mixture of methyl isopropenyl ketone and butadiene in the ratio of from about 1:4 to about 7:13, and a polyhydric alcohol ester of a rosin acid, said copolymer being essentially completely soluble in benzene and having a Mooney viscosity of about 115 to about 150.

7. A pressure-sensitive adhesive composition comprising the copolymer obtained by the emulsion polymerization of a mixture of methyl isopropenyl ketone and butadiene in the ratio of from about 1:4 to about 7:13, and a pentaerythritol ester of polymerized rosin, said copolymer being essentially completely soluble in benzene and having a Mooney viscosity of about 115 to about 150.

8. A pressure-sensitive adhesive composition comprising the copolymer obtained by the emulsion polymerization of a mixture of methyl isopropenyl ketone and butadiene in the ratio of from about 1:4 to about 7:13, and a glycerol ester of polymerized rosin, said copolymer being essentially completely soluble in benzene and having a Mooney viscosity of about 115 to about 150.

9. A pressure-sensitive adhesive composition comprising the copolymer obtained by the emulsion polymerization of a mixture of methyl isopropenyl ketone and butadiene in the ratio of from about 1:4 to about 7:13, and a maleic acid-modified pentaerythritol ester of rosin, said copolymer being essentially completely soluble in benzene and having a Mooney viscosity of about 115 to about 150.

GEORGE E. HULSE.

References Cited in the file of this patent

UNITED STATES PATENTS

| Number | Name | Date |
|---|---|---|
| 1,901,354 | Meisenburg | Mar. 14, 1933 |
| 2,382,731 | Little | Aug. 14, 1945 |
| 2,407,953 | Dreisbach et al. | Sept. 17, 1946 |
| 2,529,315 | Serniuk | Nov. 7, 1950 |

FOREIGN PATENTS

| Number | Country | Date |
|---|---|---|
| 123,533 | Australia | Feb. 20, 1947 |

OTHER REFERENCES

India Rubber World, June 1946, p. 387.

Specifications for Government Synthetic Rubbers, effective January 1, 1947, issued by Reconstruction Finance Corp., Office of Rubber Reserve, Washington, D. C.